Figure 1:
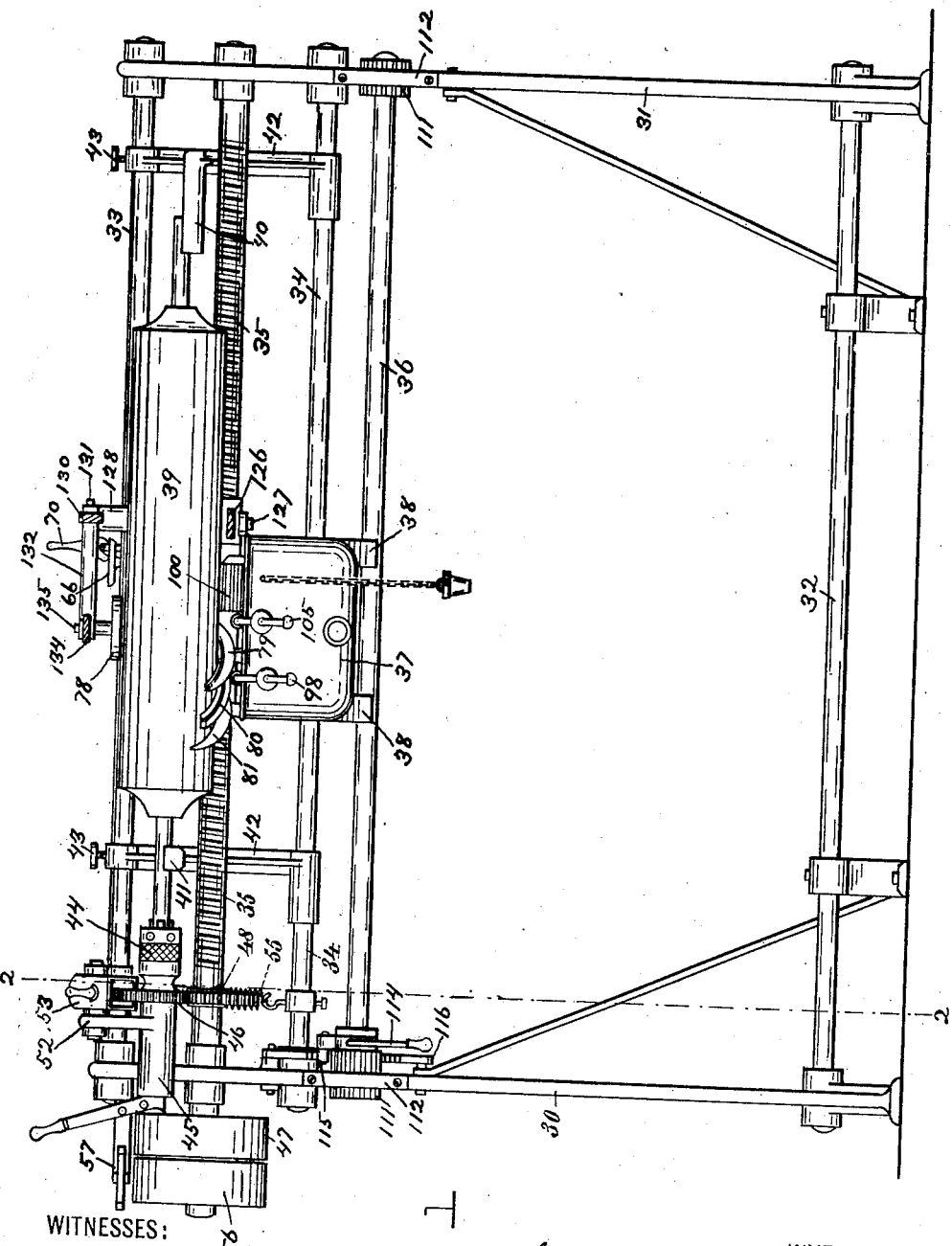

No. 826,835. PATENTED JULY 24, 1906.
S. CRUMP & G. SAGUE.
MACHINE FOR CLEANING OR TREATING PRINTERS' ROLLERS.
APPLICATION FILED JUNE 26, 1905.

9 SHEETS—SHEET 1.

WITNESSES:
Arthur Marion
John O. Dunn

INVENTORS
Samuel Crump & George Sague
BY
Chas. C. Gill
ATTORNEY

No. 826,835. PATENTED JULY 24, 1906.
S. CRUMP & G. SAGUE.
MACHINE FOR CLEANING OR TREATING PRINTERS' ROLLERS.
APPLICATION FILED JUNE 26, 1905.

9 SHEETS—SHEET 2.

WITNESSES:
Arthur Marion.
John B Dunn

INVENTORS
Samuel Crump and
George Sague,
BY
Chas. E. Gill
ATTORNEY

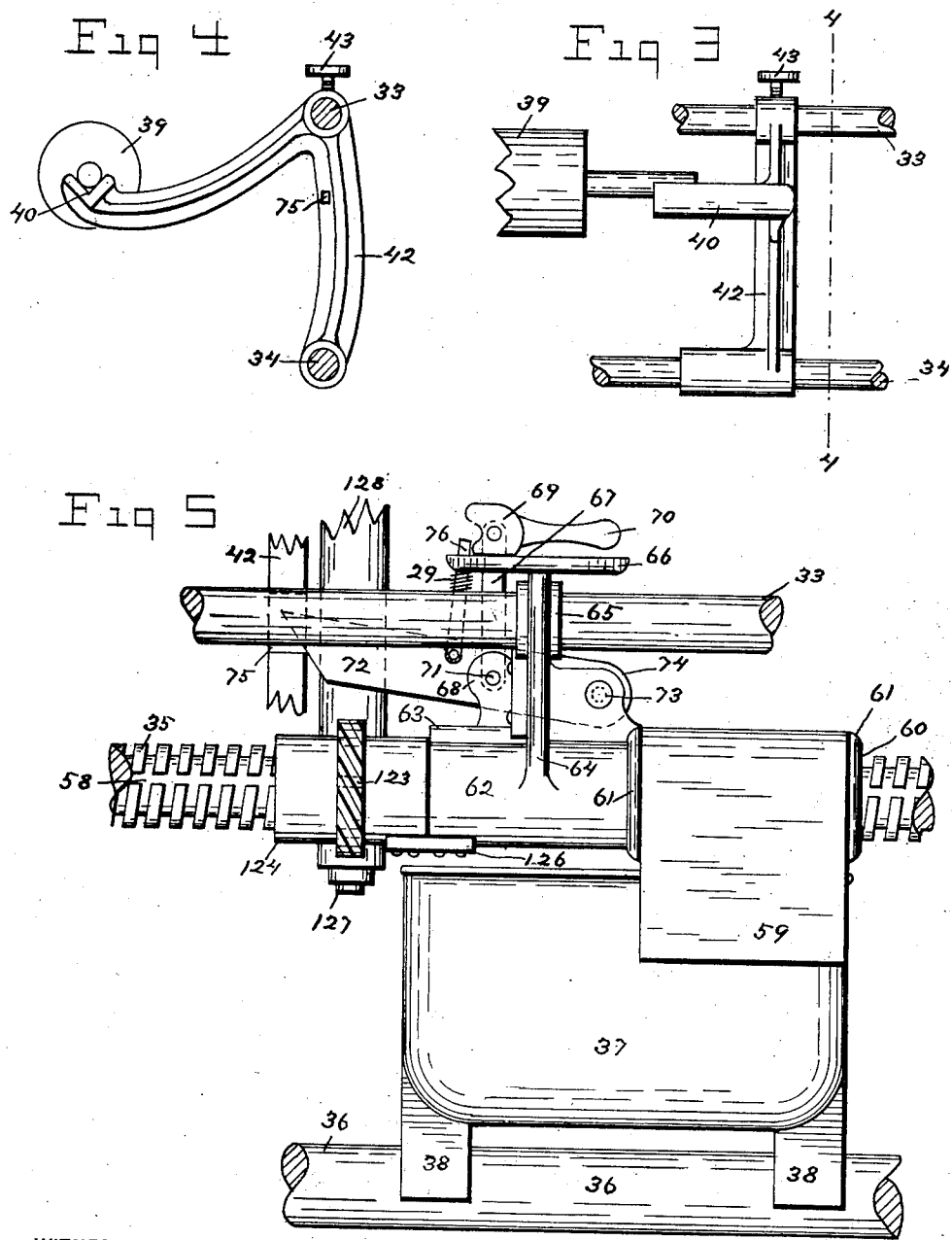

No. 826,835. PATENTED JULY 24, 1906.
S. CRUMP & G. SAGUE.
MACHINE FOR CLEANING OR TREATING PRINTERS' ROLLERS.
APPLICATION FILED JUNE 26, 1905.
9 SHEETS—SHEET 4.
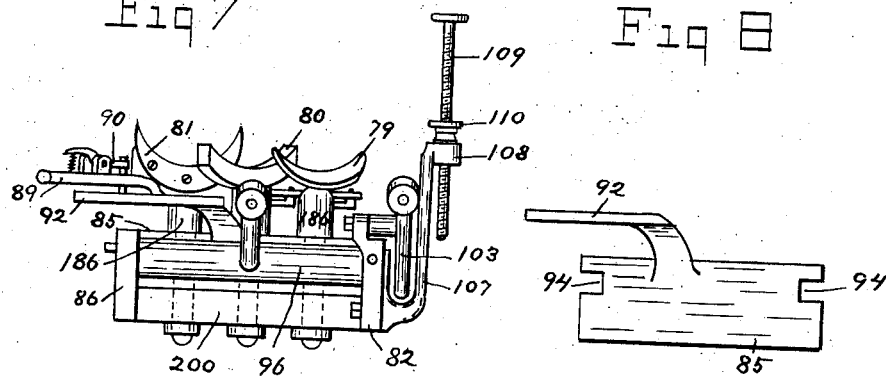
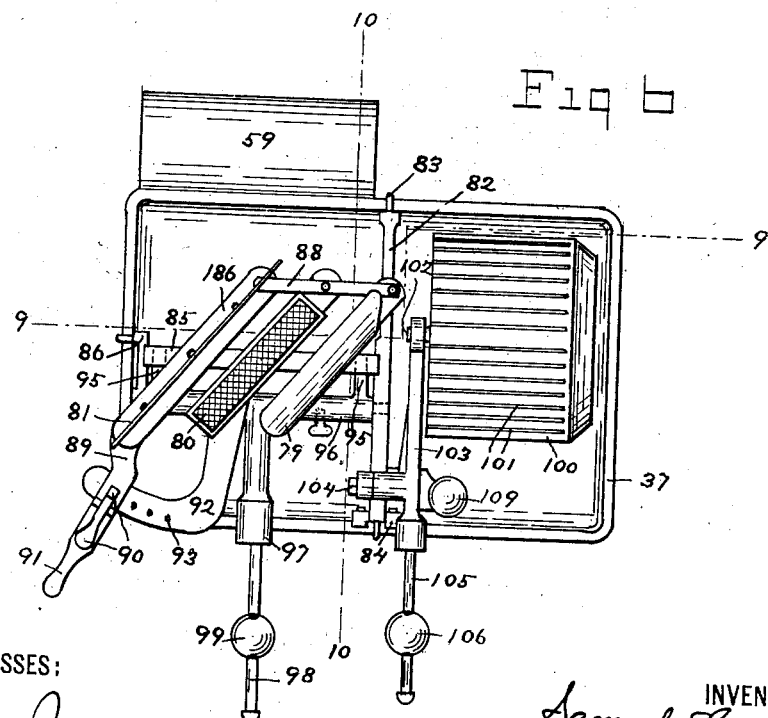

No. 826,835. PATENTED JULY 24, 1906.
S. CRUMP & G. SAGUE.
MACHINE FOR CLEANING OR TREATING PRINTERS' ROLLERS.
APPLICATION FILED JUNE 26, 1905.
9 SHEETS—SHEET 5.
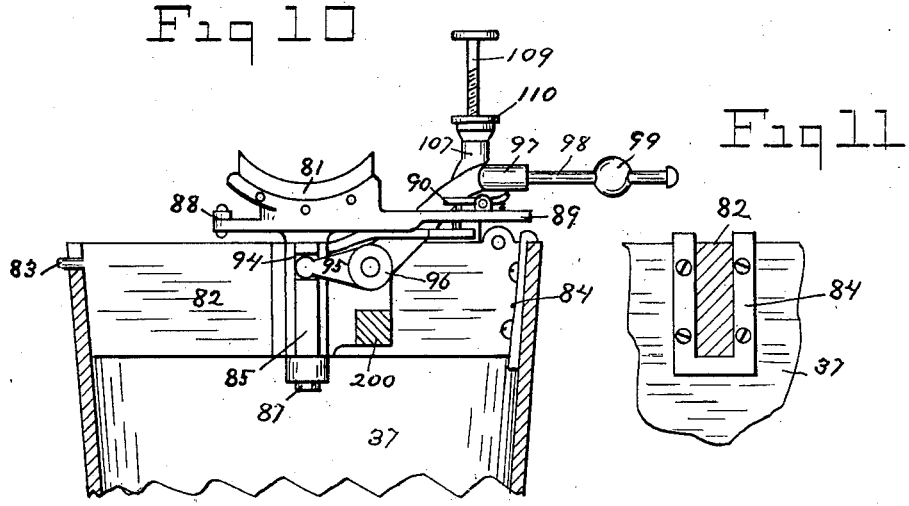
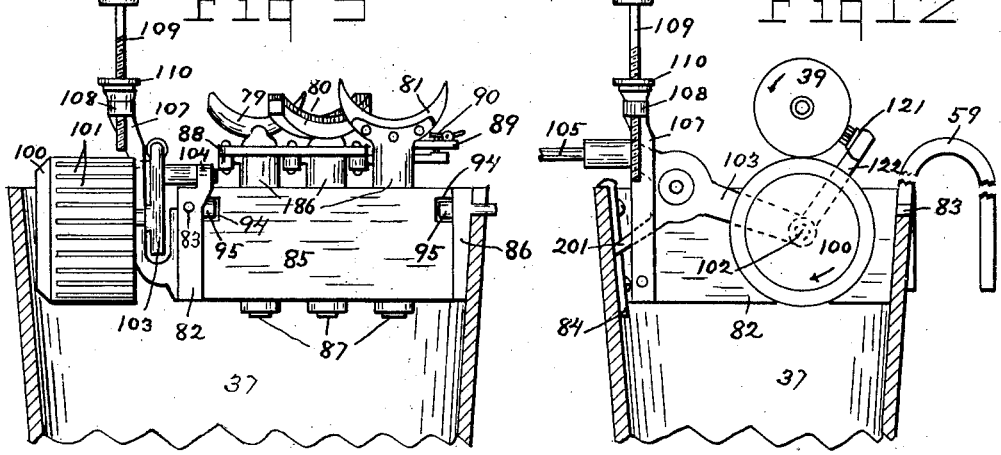

No. 826,835. PATENTED JULY 24, 1906.
S. CRUMP & G. SAGUE.
MACHINE FOR CLEANING OR TREATING PRINTERS' ROLLERS.
APPLICATION FILED JUNE 26, 1905.
9 SHEETS—SHEET 6.
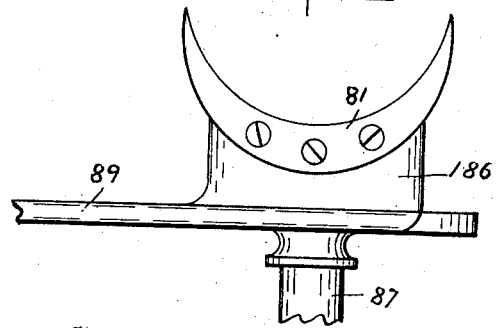
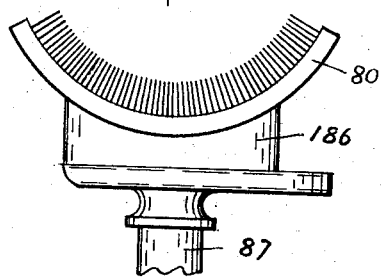
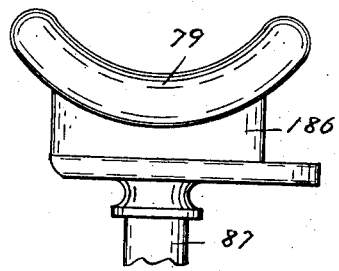
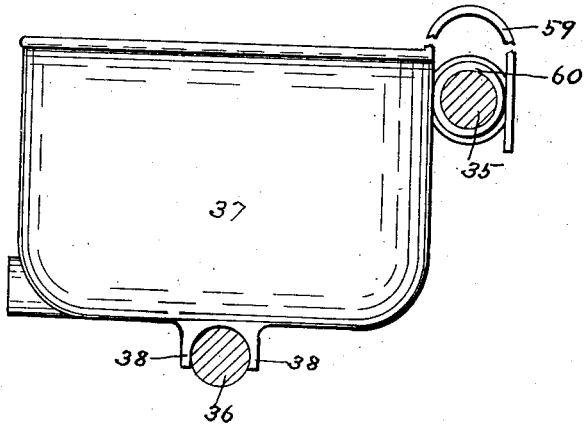
WITNESSES:
Arthur Marion
John O. Dunn
INVENTORS
Samuel Crump and
George Sague,
BY
Chas. C. Gill
ATTORNEY

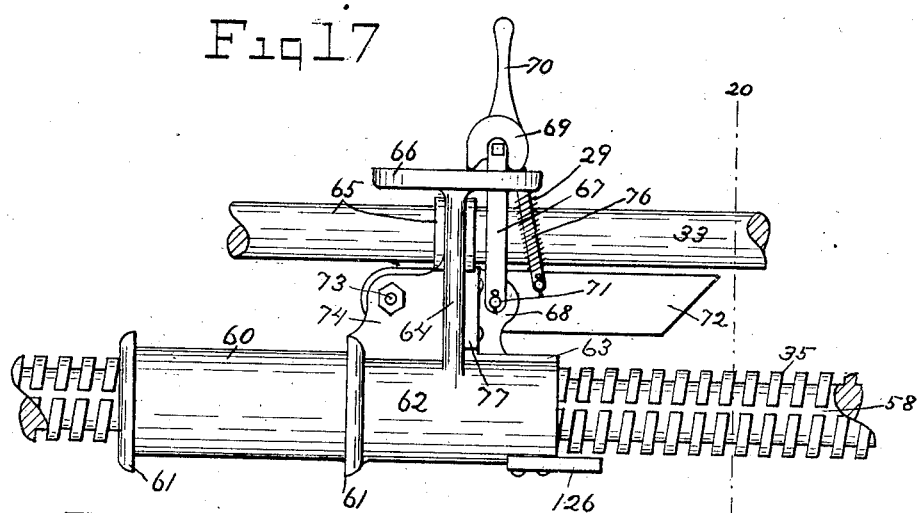
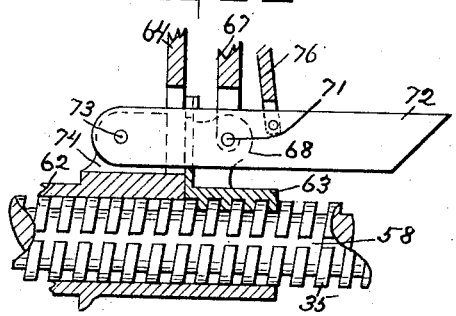
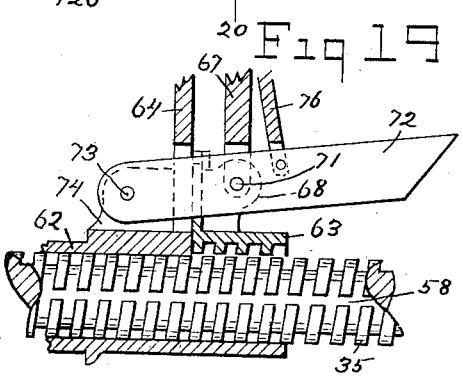
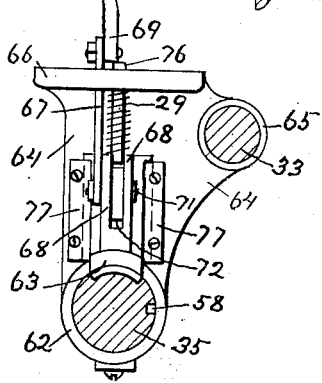

No. 826,835. PATENTED JULY 24, 1906.
S. CRUMP & G. SAGUE.
MACHINE FOR CLEANING OR TREATING PRINTERS' ROLLERS.
APPLICATION FILED JUNE 26, 1905.
9 SHEETS—SHEET 8.
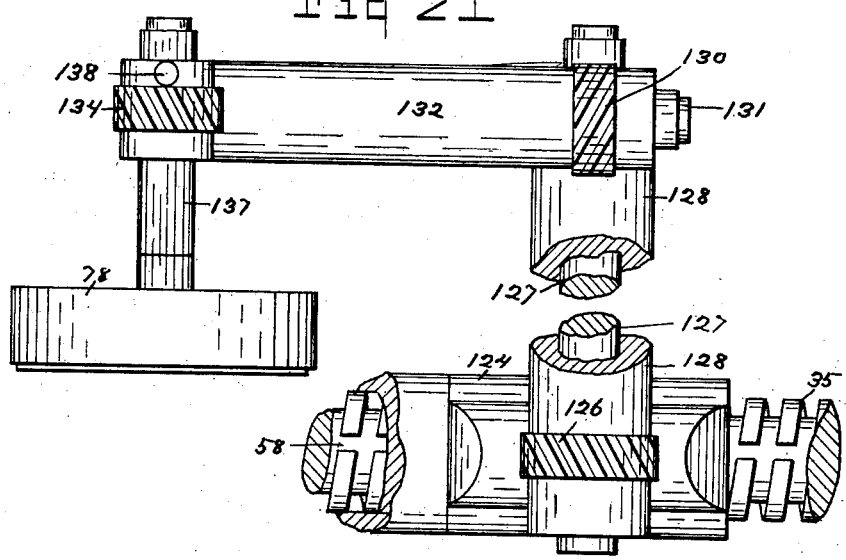
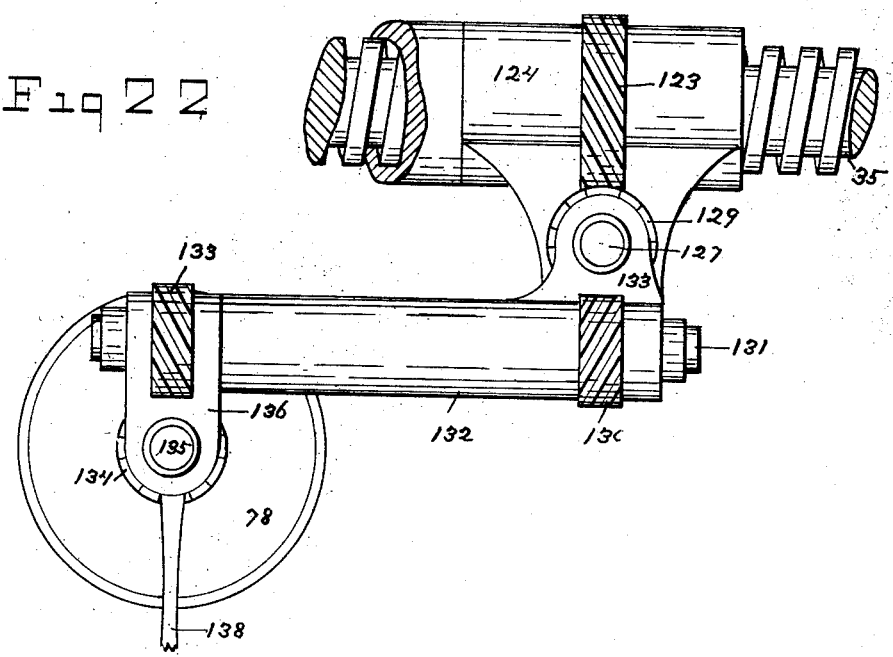
WITNESSES:
Arthur Marion
John D. Dunn
INVENTORS
Samuel Crump and
George Sague,
BY
Chas. C. Gill
ATTORNEY No. 826,835. PATENTED JULY 24, 1906.
S. CRUMP & G. SAGUE.
MACHINE FOR CLEANING OR TREATING PRINTERS' ROLLERS.
APPLICATION FILED JUNE 26, 1905.

9 SHEETS—SHEET 9.

WITNESSES:
Arthur Marion.
John B Dunn

INVENTORS.
Samuel Crump and
George Sague
BY
Chas. E. Gill
ATTORNEY

UNITED STATES PATENT OFFICE.

SAMUEL CRUMP AND GEORGE SAGUE, OF POUGHKEEPSIE, NEW YORK, ASSIGNORS, BY MESNE ASSIGNMENTS, TO SAID SAGUE.

MACHINE FOR CLEANING OR TREATING PRINTERS' ROLLERS.

No. 826,835.      Specification of Letters Patent.      Patented July 24, 1906.

Application filed June 26, 1905. Serial No. 266,961.

*To all whom it may concern:*

Be it known that we, SAMUEL CRUMP and GEORGE SAGUE, citizens of the United States, and residents of Poughkeepsie, in the county of Dutchess and State of New York, have invented certain new and useful Improvements in Machines for Cleaning or Treating Printers' Rollers, of which the following is a specification.

The invention relates to improvements in machines for cleaning or treating printers' rollers, such as the inking and distributing rollers of typographic and lithographic presses; and it consists in the novel features and combinations of parts hereinafter described, and particularly pointed out in the claims.

The object of the invention is to provide a novel machine which will with certainty and rapidity efficiently remove the accumulations of ink, paper fiber, and other matter from printers' rollers without injury to the surfaces of the latter.

In its preferred construction the machine of our invention comprises novel means for receiving the ends of the roller-shaft and imparting a rapid rotation to the roller and a novel tank containing the solvent solution and carrying along the roller a guide-shoe, a brush, and a scraper, which features are pivoted and adjustable and set at an oblique angle to the roller. The tank also contains a special solvent-wheel by which the solvent is carried up to the roller under treatment. The machine is preferably equipped with a grainer wheel or disk arranged to engage the surface of lithographic rollers during the process of cleansing the same.

The invention embraces many novel features of construction, form, and arrangement and will be fully understood from the detailed description hereinafter presented, reference being had to the accompanying drawings, in which—

Figure 2:
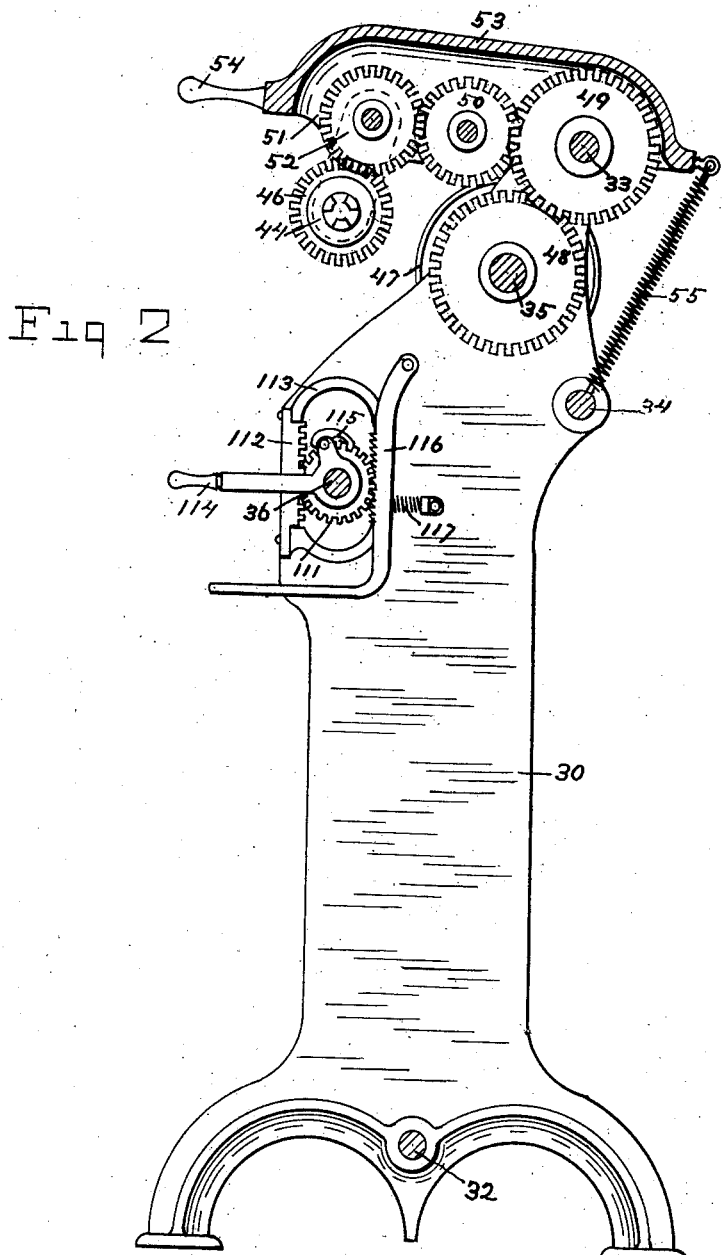
Figure 23:
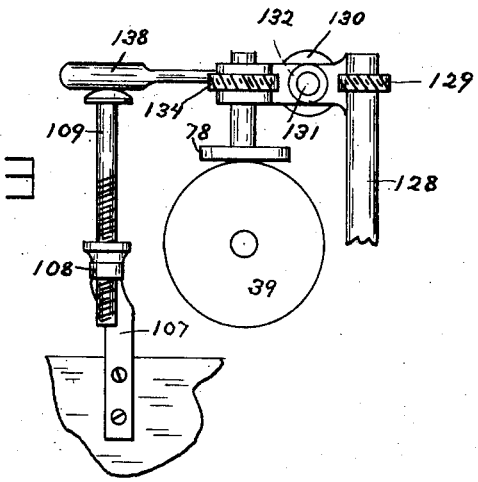
Figure 24:
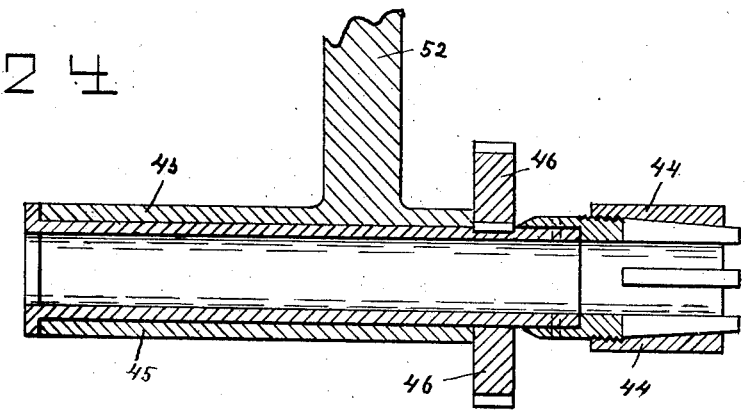

Figure 1 is a front elevation of a machine constructed in accordance with and embodying the invention, a lithographic roller being shown in position in the machine. Fig. 2 is a vertical transverse section of same on the dotted line 2 2 of Fig. 1 and illustrates more particularly the special arrangement of gearing for driving the chuck which grips one end of the roller-shaft and also for driving the long screw-shaft which compels the travel of the solvent-tank and its parts along the roller under treatment. Fig. 3 is an enlarged front elevation of a portion of the machine and illustrates more especially the V-bearing for receiving that end of the roller-shaft not held by the chuck shown in Fig. 2. Fig. 4 is a vertical section of same on the dotted line 4 4 of Fig. 3. Fig. 5 is an enlarged rear elevation of a portion of the machine. Fig. 6 is a detached top view of the solvent-tank and parts directly carried thereby, these parts comprising the solvent-wheel, guide-shoe, brush, and scraper, and their coöperating features. Fig. 7 is a front elevation of the guide, brush, and scraper mechanism lifted from the solvent-tank. Fig. 8 is a detached front elevation of a vertical movable piece of the framing for the mechanism shown in Fig. 7. Fig. 9 is a vertical longitudinal section through the solvent-tank on the dotted line 9 9 of Fig. 6. Fig. 10 is a transverse section through the solvent-tank on the dotted line 10 10 of Fig. 6 and viewing the mechanism carried by said tank from the left-hand portion of Fig. 6. Fig. 11 is a detached view of a portion of the inner right-hand wall, looking at Fig. 10, of the solvent-tank and illustrates the stirrup or loop fastened thereto by screws for supporting one end of a transverse partition, which is shown in section. Fig. 12 is a transverse sectional view through the solvent-tank on the line of the transverse partition 82 therein and viewing the solvent-wheel from the right-hand end of Fig. 6. Fig. 13 is an enlarged vertical transverse section through a portion of the machine, taken on a line with the right-hand end of the solvent-tank. Fig. 14 is a detached side elevation of the guide-shoe and a portion of its support carried by the solvent-tank. Fig. 15 is a like view of the brush and a portion of its support. Fig. 16 is a like view of the scraper and a portion of its support. Fig. 17 is an enlarged detached view taken from the front of a portion of the machine and illustrates some of the devices presented in Fig. 5 in the position they assume when the eccentric 69 is turned vertically into locking position for connecting the solvent-tank with the screw-shaft. Fig. 18 is a vertical longitudinal section through a portion of same. Fig. 19 is a view corresponding with Fig. 18, but illustrating the means for locking the solvent-tank to the screw-shaft as being released from the latter, this being the condition presented in Fig. 5. Fig. 20 is a vertical transverse section on the dotted line 20 20 of Fig. 17. Fig. 21 is an enlarged front elevation, partly broken away, of the graining-wheel and means for imparting rotary motion to the same from the long screw-shaft which moves the solvent-tank. Fig. 22 is a top view, partly broken away, of same. Fig. 23 is a detached view of a portion of the machine, taken from one end of the roller, and illustrates the graining-wheel and parts for coöperation therewith; and Fig. 24 is a longitudinal section through the rotary chuck and its supporting means.

In the drawings, 30 31 designate suitable side frames for the machine, these side frames being connected at their lower ends by a rod 32 and at their upper portions by rods 33 34 and screw-shaft 35, the latter being journaled so as to be capable of rotation in the said side frames. Extending longitudinally between the side frames 30 31 and supported therefrom is provided a vertically-adjustable rod 36, which serves as a support and guide for the solvent-tank 37, the latter being provided at the ends of its bottom with lugs 38, Figs. 1, 5, and 13, to encompass the upper portion of and guide upon said rod 36. The purpose in making the rod 36 vertically adjustable is to enable the attendant to adjust the solvent-tank 37 with respect to and in accordance with the diameter of the roller 39, placed in the machine for treatment. The roller 39 is the usual typographic or lithographic roller and is illustrated in correct position for treatment in Fig. 1.

The roller 39 has its shaft supported in V-bearings 40 41, Figs. 1, 3, and 4, which are integral with brackets 42, mounted upon the rods 33 34, the said brackets being formed with sleeves to receive said rods and provided with set-screws 43, by which said brackets may be secured in any set position. The brackets 42 are adjustable upon the rods 33 34, so as to adapt them for the different lengths of rollers 39. The roller 39 has one end of its shaft clamped within a rotary chuck 44, by which during the operation of the machine the roller is given a rapid rotation.

The chuck 44 is mounted to rotate at the end of an elongated non-rotatable sleeve or tube 45 and has connected with it a gear-wheel 46, by which said chuck is given its rotation. The sleeve 45 receives the hollow shank of the chuck 45 and is of such length that it may receive a part of the shaft of the roller 39, said shaft extending into and through said chuck as far as may be necessary. The means for imparting motion to the gear-wheel 46 and through the same to the chuck 44 are illustrated more clearly in Fig. 2, in which it may be seen that the gear-wheel 46 receives its motion from the power-wheel 47 through a train of gear-wheels 48, 49, 50, and 51, the gear-wheel 48 being on the screw-shaft 35 and said shaft at its outer end receiving the power-wheel 47. The power-wheel 47 thus imparts simultaneous motion to the screw-shaft 35 and chuck 44, the screw-shaft 35 during its rotation serving to move the solvent-tank 37 along the roller 39 and the rotation of the chuck 44 serving to rapidly rotate said roller. The chuck 44 and sleeve 45 are suspended by a link 52 from a hood or frame 53, which is pivotally mounted upon the rod 33 and is provided with a handle for convenience in raising and lowering the same. The chuck 44 being suspended by the link 52 may be adjusted into true alinement with the longitudinal center of the roller to be treated during any movement of the frame 53 to meet the special diameter of the shaft of the roller or the convenient application of said shaft to or its removal from the chuck 44. The chuck 44 may with the link 52 be raised or lowered by the movement of the frame 53 without disengaging any of the gear-wheels from each other, the gear-wheel 46 simply rolling on the gear-wheel 51 in maintaining the position of the chuck on a true vertical line and the gear-wheel 49 simply rolling on the gear-wheel 48. The rear portion of the frame 53 is connected with a spring 55, whose tendency is to counterbalance said frame. The gear-wheel 49 is mounted on the rod 33, which serves as a pivot for the frame 53, and the gear-wheels 50 and 51 are carried by and housed within the frame 53, while the gear-wheel 46 is suspended from the frame 53, and the chuck 44, connected with said gear-wheel 46, is what we term a "floating" chuck. The features connected with and means for operating the chuck 44 so as to effect the rotation of the roller 39 constitute a part of our invention, and we desire to broadly claim the same. The power-wheel 47 is a fixed wheel and is employed in connection with a usual loose-belt wheel 56, Fig. 1, an ordinary belt-shipper 57 being provided for manipulating the belt. (Not shown.)

The screw-shaft 35 is simply a plain spirally-threaded shaft having on one side a keyway 58, cut through the thread thereof, as shown in Figs. 5, 17, 18, 19, 20, and 21, and which keyway is employed solely in connection with the graining-wheel mechanism hereinafter described.

The solvent-tank 37 will preferably be of cast metal and, as above described, is mounted upon the rod 36. The rear edge of the tank 37 is formed with a loop or folded arm 59, Figs. 5, 6, 12, and 13, which passes upon a sleeve 60, Fig. 17, freely mounted upon the screw-shaft 35, the edges of said loop 59 passing between and being held by annular shoulders 61, Fig. 5, formed on said sleeve 60. The sleeve 60 is not internally threaded, and hence may be moved freely upon the screw-shaft 35. When the loop 59 of the solvent-tank 37 is upon the sleeve 60 and engaged by the shoulders 61, the said tank is compelled to follow said sleeve when the latter is moved by hand along or driven by the screw-shaft 35. The sleeve 60 is formed with an integral extension 62, which also is normally free upon the shaft 35, but which is equipped with a threaded section or block 63, Figs. 5, 17, 18, 19, and 20, which may be moved into and out of engagement with the shaft 35. When the block 63 is in engagement with the shaft 35, as shown in Figs. 17, 18, and 20, the sleeve 60 and solvent-tank 37 will be caused to travel lengthwise of the shaft 35 during the rotation of the latter, and when the block 63 is elevated clear of the shaft 35, as shown in Figs. 5 and 19, the shaft 35 will not impart its movement to the sleeve 60 and solvent-tank 37. The extension 62 of the sleeve 60 is formed with a vertical bracket 64, whose upper rear portion is formed with a sleeve 65, Fig. 20, which guides upon the upper rod 33, the latter also serving to prevent the sleeve 60 and its extension 62 from turning with or around the screw 35. Upon the upper end of the bracket 64 is formed a plate or table 66, up through which passes a link 67, whose lower end is pivotally secured upon an ear 68, connected with the threaded block 63, and whose upper end passes upwardly through the table or plate 66 and has pivotally secured to it the eccentric 69, having a handle 70, this eccentric 69 being utilized in holding the threaded block 63 out of engagement with the screw-shaft 35. When the eccentric 69 is in the position in which it is shown in Fig. 17, it permits the block 63 to remain in engagement with the screw-shaft 35, and when said eccentric is upon its side, as shown in Fig. 5, it holds the block 63 from engagement with the screw-shaft 35. The block 63 is normally held in its lower position in engagement with the screw-shaft 35 by the spring 29, Figs. 5, 17, and 20. There are two ears 68 formed on the block 63, and between these ears and pivotally secured thereto by a pin 71 is a cambar 72, one end of which is inclined, as shown in Figs. 17, 18, and 19, and the other end of which is secured upon a pin 73, extending through an extension 74 of the bracket 64. The arm 72 is a throw-out arm and normally is in the position represented in Figs. 17 and 18 during the operation of the machine; but when during such operation the solvent-tank 37 shall have reached the end of its line of travel the inclined end of said arm will enter a slot 75, formed in the right-hand bracket 42, Figs. 4 and 5, and be turned upwardly, with the result of automatically elevating the threaded block 63 clear of the screw-shaft 35 and arresting the solvent-tank 37 without interfering with the continued rotation of the screw-shaft 35. The throw-out arm 72 has pivotally connected with it a rod 76, encompassed by the aforesaid spring 29, as shown in Fig. 17, and extending upwardly through the plate or table 66 and engaging the lower edge of the eccentric 69, as shown in Fig. 20, at one side of the pivotal center of the latter, as shown in Fig. 17. When the eccentric 69 is in the position shown in Fig. 17, the spring 29 is holding the threaded block 63 in engagement with the screw-shaft 35, and when the solvent-tank 37 reaches the end of its line of travel and the throw-out arm 72 is moved upwardly by entering the slot 75 in the right-hand bracket 42 said arm 72 will elevate the block 63 from engagement with the shaft 35 and at the same time move the link 67 and rod 76 upwardly, whereby the eccentric 69 becomes elevated and falls over upon its side and the spring 29 becomes compressed against the table 66, as shown in Fig. 5, the eccentric then preventing the block 63 from, under the action of the spring 29, returning into engagement with the said shaft until the operator manually restores the eccentric 69 to the position in which it is shown in Fig. 17, and thereby releases the spring 29 to act. When the solvent-tank 37 has reached the end of its line of travel and the block 63 has been elevated from the screw-shaft 35, the roller 39 will be removed from the machine and the operator will slide the sleeve 60 and solvent-tank 37 to their initial position at the opposite end of the shaft 35 and then turn the eccentric 69 upwardly to the position shown in Fig. 17, so as to effect or permit the connection of the sleeve 60 and its parts with said shaft. The ears 68, connected with the threaded block 63, are adapted to move in vertical guides 77, Fig. 20, secured upon the face of the bracket 64.

The mechanism for supporting and operating the graining-wheel 78 is also connected with the extension 62 of the sleeve 60, so that said wheel and said mechanism may travel with the solvent-tank 37, and said wheel and mechanism will be hereinafter described, following a description of the guide, brush, and scraper carried by the solvent-tank 37.

The mechanism supported with in the solvent-tank 37 and connected with the guide 79, brush 80, and scraper 81 are more clearly represented in Figs. 7 to 12, inclusive. Within the tank 37 is provided a transverse partition 82, one end of which is formed with a pin 83, Figs. 6 and 10, which sets within a notch formed in the upper rear edge of the tank 37, while the other end of said partition rests within a stirrup 84, secured against the inner face of the front wall of the tank 37, as shown in Figs. 6, 10, and 11, said partition 82 thus being rendered removable. The front end of the partition 82 may also be formed with a pin, as shown in Fig. 6, corresponding with the pin 83 at the rear end of said partition, to engage a notch in the front edge of the tank 37 as an aid to firmly sustaining the partition in position.

Extending lengthwise of the right-hand portion of the tank 37 and at right angles to the partition 82 is a vertically-movable plate 85, which is guided in vertical grooves in the partition 82 and in a frame 86, applied to the left-hand wall of the tank 37. The rear face of the plate 85 is shown in Fig. 9, and this plate 85 supports the guide 79, brush 80, and scraper 81, the said parts being secured to independent heads 186, which rest upon the upper edge of the plate 85 and have pivotal stems 87, which extend downwardly through said plate and may have a turning or pivotal action therein. The stems 87 are centrally of the guide, brush, and scraper, and hence these features may have a pivotal action from their centers, so that they may be placed at the most desirable angle to the roller 39 and adjusted in accordance with the varying diameters of rollers to be treated. The guide 79, brush 80, and scraper-blade 81 are of crescent shape or curved on the arc of a circle which is greater than that of the roller 39 to be treated, whereby said features may always stand at an oblique angle to the roller subjected to their action and may be adjusted angularly with respect to the diameter of the roller. The heads 186 may be of any convenient outline, since they are intended merely to provide means for receiving the guide, brush, and scraper-blade, and these heads are, as shown in Fig. 6, connected by a pivoted link 88, whereby the guide, brush, and scraper-blade are compelled to have corresponding movement and are maintained at the same angle to the roller 39. The scraper-blade 81 is formed with a frontwardly-projecting arm 89, carrying a spring-detent 90 and forming at its outer end a convenient handle 91 for the use of the operator in adjusting the angular position of the guide, brush, and scraper-blade.

The plate 85, Figs. 6 and 8, is formed with a frontwardly-projecting arm 92, having a segmental extension 93, formed with a series of apertures, as shown in Fig. 6, to receive the point of the detent 90, the said extension 93 being below the arm 89, connected with the scraper-blade and coöperating therewith in securing the scraper-blade with the brush and the guide in their adjusted positions. The plate 85 therefore supports the guide, brush, and scraper-blade, together with the means for adjusting said parts as to their angular positions with respect to the roller 39. The plate 85 is formed at its opposite end edges with recesses 94, as shown in Figs. 8, 9, and 10, and into these are projected the rear ends of the lever-arms 95, which extend rearwardly from a rocking frame 96 and are utilized to raise and lower the plate 85 and parts carried thereby, whereby the guide, brush, and scraper-blade may be elevated into contact with the roller 39 in accordance with the diameter of the latter and may be conveniently lowered therefrom. The frame 96 (shown in end elevation in Fig. 10, front elevation in Fig. 7, and top elevation in Fig. 6) is journaled in the partition 82 and frame 86, and the said frame 96 has a frontwardly-projecting arm 97, which extends upwardly and forwardly from the tank 35 and carries a rod 98, upon which is placed a counterbalance-weight 99, the arm 97 and weight 99, which may be slid upon the rod 98, serving to counterbalance the plate 85 and parts connected therewith or overbalance the same, as may be desired. The rod 98 also serves as a convenient handle by which the operator may upon raising or lowering the same depress or elevate the plate 85 and parts carried thereby. The frame 86 is connected by a bar 200 with the partition 82.

Within the tank 37 to the right of the partition 82 is provided a solvent-wheel 100, which during the operation of the machine will feed the solvent to the roller 39. The wheel 100 will preferably be formed of wood and have in and crossing its surface the series of grooves 101, which will be very shallow at the right-hand end of the wheel and deepen thence toward the left-hand end of the wheel, this arrangement of the grooves 101 serving to feed the solvent in proper quantity to the roller 39 without waste and without the solvent being spattered about. The deepening of the grooves 101 toward their inner or left-hand ends is particularly desirable, in that thereby the pressure of the roller 39 on the liquid in said grooves will move said liquid inwardly or toward the left into the tank 37 instead of squirting it outwardly to the right beyond the tank 35. The wheel 100 is mounted upon a shaft 102, which is carried at the inner or rear end of an arm 103, pivotally mounted, as at 104, and having a frontwardly-projecting rod 105, upon which is confined an adjustable counterbalance-weight 106. The arm 103 is also provided with a stop-finger 201, Fig. 12, which prevents the roller 100 from descending unduly into the tank 37.

Upon the side of the partition 82 near the front wall of the tank 37 is secured a bracket or upwardly-extending arm 107, as more clearly shown in Fig. 7, having a horizontally-disposed threaded lug 108, through which passes a stop-screw 109, the latter being adjustable in said lug 108 and being adapted to be locked in position by a jam-nut 110. The stop-screw 109 is for use in connection with the graining-wheel and will be referred to hereinafter.

The operation of the machine as thus far described is as follows: The roller 39 having been secured in position and the solvent-tank being at the left-hand end of the screw-shaft 35 and power having been applied to the belt-wheel 47, the roller 39 will be rapidly rotated, preferably making about one hundred and thirty rotations per minute, and the attendant will by turning the eccentric 69 to the position shown in Fig. 17 allow the throw-out arm 72 and the threaded block 63 to move downwardly to the position shown in Fig. 18, thereby restoring the arm 72 into its operative position and by means of the block 63 connecting the solvent-tank 37 with the threaded shaft 35. The shaft 35 having been set in motion by the power applied to the belt-wheel 47 will rotate and by reason of its engagement with the block 63 will compel the travel of the solvent-tank and parts carried thereby along the line of the roller 39. The attendant will see that the solvent-wheel 100 is feeding solvent to the roller 39 and will also not only angularly adjust the guide, brush, and scraper-blade with respect to the roller 39, but see that said parts are in proper vertical adjustment with regard to said roller. The machine having been set in motion and the parts having been adjusted, as hereinbefore explained, the solvent-tank will travel along the roller 39 and the guide 79, and thereafter the brush and scraper-blade following the solvent-wheel will act upon the surface of said roller and thoroughly clean the same. The solvent-tank 37 will continue its motion along the threaded shaft 35 until the throw-out arm 72 enters the recess 75 in the right-hand bracket 42, Fig. 5, and becomes elevated, and thereby disengages the threaded block 63 from the threaded shaft 35, the tank 37 then coming to a stop without interfering with the continued rotation of the said shaft 35.

The parts above described are all of the parts necessary for cleaning typographic rollers; but in the case of lithographic rollers when the graining of the roller is desired a graining-wheel 78 will be made use of; but we do not limit our invention in every instance to the employment of the graining-wheel.

The guide 79 slants downwardly toward the right, and its upper edge is about one-eighth of an inch below the scraping edge of the blade 81, and hence when the blade 81 is in engagement with the roller 39 the guide 79 rides idly slightly below said roller. The guide 79 comes into use when the solvent-tank 37 is at the left-hand side of the machine and is about to start on its path below the roller 39. At this time the guide 79, brush 80, and blade 81 will be in an upper position above the line of the lower surface of the roller 39 and to the left beyond the left-hand end thereof, and under such condition, the screw-shaft 35 being in motion, the tank 37 will travel toward the right, and the guide 79 will strike against the left-hand end edges of the roller 39 and, being inclined, will travel down the same and against the lower surface of said roller, the presence of the roller serving to push the guide 79 downwardly, so that said guide may pass below said roller. This downward movement of the guide 79 results in the corresponding downward movement of the brush 80 and blade 81, and hence when the tank 37 has traveled sufficiently far for said brush and blade to engage the surface of the roller 39 said brush and blade will be in proper position to engage said roller, and thereupon, the blade 81 being slightly higher than the guide 79, the latter will travel clear of the roller, and only the brush and blade will engage the latter. The purpose of the guide 79 is therefore at the starting of the operation to guide the brush 80 and blade 81 into just the proper position to properly engage the roller 39. In the absence of the guide 79 the attendant would have to exercise special care in engaging the blade 81 with the roller 39. Otherwise said blade might on its first contact with the roller 39 by being too high injure the same. The brush 80 is a scratch-brush, and it serves to cut up the color and matter on the roller, so that the solvent may readily engage the same preparatory to the scraping and cleaning action of the blade 81.

The guide, brush, and scraper-blade are of crescent-edge outline or have concave edges to engage the surface of the roller 39, the curvature of these edges not necessarily defining a technically true arc of a circle, but having a greater sweep than the circle of the roller, whereby said features are not only rendered effective for rapid work, but are rendered adjustable to the varying diameters of rollers to be treated, the axial adjustment of the guide, brush, and scraper-blade being conveniently permitted and adding greatly to the efficiency and adaptability of the machine.

The guide, brush, and scraper-blade, or the blade alone, if that only is used, may be caused to yieldingly engage the roller 39 by the counterbalancing or overbalancing effect of the weight 99, and in addition the operator may while observing the condition of the roller increase or decrease the pressure of the blade against the same by manual force applied to the handle-rod 98. The solvent-wheel 100 may also be moved by hand into more or less firm contact with the roller 39, or the weight 106 may be utilized for pressing said wheel automatically and with a yielding pressure against said roller.

The brush 80 is a scratch-brush, and we do not limit the invention to its employment in the position shown in Fig. 6, since a scratch-brush may be applied to the roller 39 in various ways, one of which is illustrated in Fig. 12, wherein we illustrate a brush 121 engaging the roller 39 and carried by a crank-arm 122, connected with the shaft of the solvent-wheel 100. The scratch-brush 80 in the position shown in Figs. 6 and 9 is very effective and represents the preferred construction. The more essential feature of the mechanism carried by the tank 37 is the pivotally-mounted oblique scraper-blade 81, having its operating edge on the arc of a circle of greater diameter than that of the roller to be treated, so that said blade may stand at an oblique angle to the roller and be adjusted to meet the varying diameters of rollers.

The solvent-tank 37 operates as a carriage for the scraper-blade 81, this tank under the construction illustrated serving not only to supply the solvent to the roller and carrying the scraper-blade 81, but receiving the matter removed from the roller.

We do not limit our invention to the fact of causing the tank and scraper-blade to travel along the roller 39, and we would regard our invention as present in a machine comprising the oblique scraper-blade whether the latter traveled along the roller 39 or remained stationary and the rotating roller traveled along it. There must be a relative movement between the roller and the scraper-blade in the longitudinal direction of the roller, and while we illustrate the rotating roller as held in stationary bearings and the scraper-blade as being caused to travel we do not exclude from our invention a machine in which the rotating roller may be caused to travel with relation to the blade 81.

As a preliminary step to the operation of the machine the solvent-tank 37 should be vertically adjusted with respect to the diameter of the roller to be treated, because it is not desired that the solvent-wheel, guide, brush, and scraper-blade should be required to have undue vertical adjustment with respect to the roller, and therefore we support the solvent-tank 37 upon the rod 36, which is vertically adjustable. When a roller of small diameter is to be treated, the rod 36 and tank 37 will be adjusted upwardly toward the roller, and when a roller of larger diameter is to be treated the rod 36 and tank 37 will be correspondingly lowered. We do not limit the invention to any special vertically-adjustable support for the tank 37, but in the present instance illustrate the ends of the rod 36 as provided with gear-wheels 111, Fig. 1, in engagement with vertical rack-bars 112, secured to the side frames 30 31, Figs. 1 and 2, said gear-wheels 111 being held within loop-frames 113. Adjacent to the left-hand end of the machine we provide upon the rod 36 a pivoted lever-arm 114, carrying a pivoted pawl 115 in engagement with a portion of the adjacent gear-wheel 111. In rear of this gear-wheel 111 we pivotally secure to the frame 30 a toothed bar 116, which is pressed by a spring 117 against the said gear-wheel to prevent downward travel of the same, the said bar 116 serving to lock the gear-wheel against downward movement, and this serving to lock the shaft 36 and tank 37 in such position as may be given to them. The pawl 115 has a hook-point which enters between the teeth of the gear-wheel 111, and thus when the lever-arm 114, Fig. 2, is pushed downwardly at its outer end the pawl 115 will cause the gear-wheel 111 to travel upwardly upon its rack-bar 112, thus elevating the rod 36 and tank 37, since both ends of the rod 36 move correspondingly, though power is applied only to one end of said rod. The rod 36 becomes elevated, due to an oscillatory or pumping action of the lever-arm 114, and said rod may be lowered by simply freeing the pawl 115 from its gear-wheel and pressing the lower end of the toothed bar 116 inwardly clear of said gear-wheel, thus allowing the rod 36 to descend by gravity.

The loop or folded arm 59 on the tank 37 may in the vertical adjustment of said tank move vertically on the sleeve 60 and between the flanges 61 thereon without losing its connection therewith. The loop or folded arm 59 also permits the tank 37 to be lifted from the machine whenever desired.

The guide 79, brush 80, and scraper 81 may also be readily lifted from the tank 37 with the partition 82 and frame 86.

We have hereinbefore described the construction and operation of all of the features of the machine, except those connected with the graining-wheel 78, and this wheel 78 will be employed when the roller under treatment is a lithographic roller. The wheel 78 receives its motion from the screw-shaft 35 through a series of spiral gear-wheels and shafts. (More clearly illustrated in Figs. 1, 21, 22, and 23.) The screw-shaft 35 is formed with the keyway 58, and upon this shaft is mounted a spiral gear-wheel 123, Figs. 5 and 22, which has a feather disposed within the said keyway 58, so that during the rotation of the shaft 35 the said wheel 123 will be compelled to rotate, but may at the same time be moved along said shaft under the influence of the sleeve 60, which carries the solvent-tank along. The spiral gear-wheel 123 is held within a yoke 124, Figs. 5 and 22, which encompasses the shaft 35 and is connected by a block 126, Fig. 5, with the extension 62 of the sleeve 60, whereby said yoke 24 is compelled to travel with said sleeve, while in the meantime the spiral gear 123 is rotated by means of the shaft 35. The spiral gear 123 is in mesh with a spiral gear-wheel 126, Figs. 1 and 21, secured at the lower end of a vertical shaft 127, mounted in a vertical sleeve 128, supported from the yoke 124, and upon the upper end of this shaft 127 is secured a corresponding spiral gear-wheel 129, Fig. 22, which engages a spiral gear-wheel 130, secured upon a horizontal shaft 131, which extends lengthwise of the roller 39 and is mounted in a sleeve 132, which by means of an ear 133, Fig. 22, is supported from the vertical sleeve 128. The spiral gear-wheel 130 is secured upon one end portion of the shaft 131, and upon the other end portion of said shaft is secured a spiral gear-wheel 133, which is in mesh with a spiral gear-wheel 134, secured upon the spindle 135 of the graining-wheel 78, which spindle normally stands vertically and extends upwardly through a yoke 136, Fig. 22, which is hung upon the shaft 131 and is bifurcated to straddle the spiral gear-wheel 133, as shown in Fig. 22, while at its outer portion said yoke 136 receives between its upper and lower arms the spiral gear-wheel 134, as shown in Fig. 21. Below the yoke 136 is a sleeve 137, through which the spindle 135 passes and which affords a substantial bearing for the same, and the said yoke 136 is provided at one side with a handle or arm 138, which is adapted when the machine is in operation to rest upon the vertical screw 109, hereinbefore described, as shown in Fig. 23. The position of the screw 109 regulates the contact of the graining-wheel 78 with the roller 39. If the roller 39 should have some raised places on its surface, it would be desirable to move the screw 109 upwardly, so that the wheel 78 might smooth down such raised surfaces or elevations, and thus be prevented from harshly treating the roller. The purpose of the screw 109 is therefore to regulate the relation of the wheel 78 to the roller 39, so as to enable the wheel 78 to efficiently perform its duty with respect to rollers varying in condition. During the rotation of the threaded shaft 35 to move the solvent-tank 37 and scraper-blade 81 the motion of the tank is communicated to the yoke 124 and parts connected with the graining-wheel 78, and the rotation of the screw-shaft 35 is communicated to said wheel 78, so that it may rotate with its face against the surface of the roller 39. The shaft 35 imparts rotary movement to the spiral gear-wheel 123, keyed upon it, and this spiral gear-wheel 123 communicates motion through the spiral gear-wheel 126 to the vertical shaft 127 and also to the spiral gear-wheel 129, fastened upon the upper end of said shaft. The gear-wheel 129 imparts motion to the spiral gear-wheel 130 and shaft 131, and this shaft carrying the spiral gear-wheel 133 imparts motion through the gear-wheel 134 to the graining-wheel 78. Thus the machine is adapted for cleaning and graining lithographic rollers, as well as for cleaning typographic rollers.

When it is not desired to use the disk wheel 78, the wheel and its spindle will be turned upside down upon the shaft 131, the yoke 136 operating as the hinge, said yoke being freely hung upon said shaft 131. The wheel 78 may be used technically as a means for grinding down rough surfaces on the roller 39 or for graining said roller.

What we claim as our invention, and desire to secure by Letters Patent, is—

1. In a machine for treating a roller, means for rotating said roller, and an oblique scraper-blade having a concave edge to engage the surface of said roller, the concavity of said edge being on the arc of a circle greater than that of the roller, combined with means yieldingly supporting said blade below said roller so that it may engage the under side of the latter, and automatic means to be driven by power for effecting a relative movement in the longitudinal direction of the roller between the latter and said blade, whereby the blade is enabled to clean said roller; substantially as set forth.

2. In a machine for treating a roller, means for rotating said roller, and an oblique scraper-blade having a concave edge to engage the surface of said roller, the concavity of said edge being on the arc of a circle greater than that of the roller, combined with automatic means to be driven by power for effecting a relative movement in the longitudinal direction of the roller between the latter and said blade, whereby the blade is enabled to clean said roller, a frame below and movable toward and from said roller for supporting said blade, and means for automatically effecting a yielding pressure of said blade against the under side of said roller; substantially as set forth.

3. In a machine for treating a roller, means for rotating said roller, and an oblique scraper-blade having a concave edge to engage the surface of said roller, combined with means for effecting a relative movement in the longitudinal direction of the roller between the latter and said blade, whereby the blade is enabled to clean said roller, and means for adjusting the angular position of said blade in accordance with the diameter of said roller; substantially as set forth.

4. In a machine for treating a roller, means for rotating said roller, and an oblique scraper-blade having a concave edge to engage the surface of said roller, the concavity of said edge being on the arc of a circle greater than that of the roller and said blade being below and adapted to engage the under side of said roller, combined with means for effecting a relative movement in the longitudinal direction of the roller between the latter and said blade, whereby the blade is enabled to clean said roller, and means for applying a solvent to said roller only in advance of said blade whereby said blade is enabled to remove the ink and solvent from said roller; substantially as set forth.

5. In a machine for treating a roller, means for rotating said roller, and an oblique scraper-blade having a concave edge to engage the surface of said roller, the concavity of said edge being on the arc of a circle greater than that of the roller, combined with means for effecting a relative movement in the longitudinal direction of the roller between the latter and said blade, whereby the blade is enabled to clean said roller, and a brush in engagement with said roller in advance of said blade; substantially as set forth.

6. In a machine for treating a roller, means for rotating said roller, and an oblique scraper-blade having a concave edge to engage the surface of said roller, combined with means for effecting a relative movement in the longitudinal direction of the roller between the latter and said blade, whereby the blade is enabled to clean said roller, a concave oblique brush in engagement with said roller, and means for adjusting the angular position of said blade and brush in accordance with the diameter of said roller; substantially as set forth.

7. In a machine for treating a roller, means for rotating said roller, and an oblique scraper-blade having a concave edge to engage the surface of said roller, combined with means for effecting a relative movement in the longitudinal direction of the roller between the latter and said blade, whereby the blade is enabled to clean said roller, a concave oblique guide to preliminarily engage said roller, and means for adjusting the angular position of said blade and guide in accordance with the diameter of said roller; substantially as set forth.

8. In a machine for treating a roller, means for rotating said roller, and an oblique scraper-blade having a concave edge to engage the surface of said roller, combined with means for effecting a relative movement in the longitudinal direction of the roller between the latter and said blade, whereby the blade is enabled to clean said roller, a concave oblique brush in engagement with said roller, a concave oblique guide to preliminarily engage said roller, and means for adjusting the angular position of said blade, brush and guide in accordance with the diameter of said roller; substantially as set forth.

9. In a machine for treating a roller, means for rotating said roller, and an oblique scraper-blade having a concave edge to engage the surface of said roller, the concavity of said edge being on the arc of a circle greater than that of the roller, combined with a carriage supporting said blade below the under side of said roller, means for moving said carriage vertically, means for yieldingly pressing said blade upwardly toward said roller, and automatic means to be driven by power for moving said carriage longitudinally of said roller for causing said blade to travel along and clean the roller; substantially as set forth.

10. In a machine for treating a roller, means for rotating said roller, and an oblique scraper-blade having a concave edge to engage the surface of said roller, the concavity of said edge being on the arc of a circle greater than that of the roller combined with a carriage supporting said blade, means for moving said carriage longitudinally of said roller for causing said blade to travel along and clean the roller, and means for automatically arresting said carriage at the end of its line of travel; substantially as set forth.

11. In a machine for treating a roller, means for rotating said roller, and an oblique scraper-blade having a concave edge to engage the surface of said roller, combined with a carriage supporting said blade, an oblique concave brush in engagement with said roller and supported by said carriage, and means for moving said carriage longitudinally of said roller for causing said blade and brush to travel along and clean the roller; substantially as set forth.

12. In a machine for treating a roller, means for rotating said roller, and an oblique scraper-blade having a concave edge to engage the surface of said roller, combined with a carriage supporting said blade, a rotary screw-shaft in line with said roller, a threaded block connected with said carriage for engagement with said shaft when the latter is to effect the travel of said carriage, and means for automatically disengaging said block from said shaft when the carriage reaches the end of its line of travel; substantially as set forth.

13. In a machine for treating a roller, means for rotating said roller, and an oblique scraper-blade having a concave edge to engage the surface of said roller, the concavity of said edge being on the arc of a circle greater than that of said roller, combined with a solvent-tank supporting said blade, means within said tank for applying a solvent solution to said roller, and means for moving said tank longitudinally of said roller; substantially as set forth.

14. In a machine for treating a roller, means for rotating said roller, and an oblique scraper-blade having a concave edge to engage the surface of said roller, combined with a solvent-tank supporting said blade, an oblique concave brush also supported by said tank and to engage said roller, means within said tank for applying a solvent solution to said roller, and means for moving said tank longitudinally of said roller; substantially as set forth.

15. In a machine for treating a roller, means for rotating said roller, and an oblique scraper-blade having a concave edge to engage the surface of said roller, combined with a solvent-tank supporting said blade, an oblique concave brush also supported by said tank and to engage said roller, means for moving said blade and brush toward and from the roller, means for adjusting the angular relation of said blade and brush to said roller, means within said tank for applying a solvent solution to said roller, and means for moving said tank longitudinally of said roller; substantially as set forth.

16. In a machine for treating a roller, means for rotating said roller, and an oblique scraper-blade having a concave edge to engage the surface of said roller, combined with a solvent-tank supporting said blade, means within said tank for applying a solvent solution to said roller, a rotary screw-shaft in line with said roller, a threaded block connected with said tank for engagement with said shaft when the latter is to effect the travel of said tank, and means for automatically disengaging said block from said shaft when said tank reaches the end of its line of travel; substantially as set forth.

17. In a machine for treating a roller, means for rotating said roller, and an oblique scraper-blade having a concave edge to engage the surface of said roller, combined with a solvent-tank supporting said blade, an oblique concave brush also supported by said tank and to engage said roller, means for moving said blade and brush toward and from the roller, means for adjusting the angular relation of said blade and brush to the roller, means within said tank for applying a solvent solution to said roller, a rotary screw-shaft in line with said roller, a threaded block connected with said tank for engagement with said shaft when the latter is to effect the travel of said tank, and means for automatically disengaging said block from said shaft when said tank reaches the end of its line of travel; substantially as set forth.

18. In a machine for treating a roller, means for rotating said roller, a tank for the solvent solution, and a wheel within said tank for conveying the solution to the roller, said wheel having grooves crossing its periphery, combined with an oblique concave scraper-blade to engage the roller, and means for effecting a relative movement in the longitudinal direction of the roller between the latter and said tank, wheel and blade; substantially as set forth.

19. In a machine for treating a roller, means for rotating said roller, a tank for the solvent solution, and a wheel within said tank for conveying the solution to the roller, said wheel having grooves crossing its periphery and being shallow at their outer ends and thence deepening toward their inner ends, combined with a scraper to engage the roller, and means for effecting a relative movement in the longitudinal direction of the roller between the latter and said tank, wheel and scraper; substantially as set forth.

20. In a machine for treating a roller, means for rotating said roller, a pivotally-mounted oblique scraper for engaging the surface of said roller, means for adjusting the angular relation of said scraper to said roller, and means for moving said scraper toward and from said roller, combined with means for effecting a relative movement in the longitudinal direction of the roller between the latter and said scraper; substantially as set forth.

21. In a machine for treating a roller, means for rotating said roller, a pivotally-mounted oblique scraper for engaging the surface of said roller, means for adjusting the angular relation of said scraper to said roller, means for moving said scraper toward and from said roller, means for applying a solvent to said roller, and a scratch-brush to engage said roller, combined with means for effecting a relative movement in the longitudinal direction of the roller between the latter and said scraper and brush; substantially as set forth.

22. In a machine for treating a roller, means for rotating said roller, a pivotally-mounted oblique scraper for engaging the surface of said roller, means for adjusting the angular relation of said scraper to said roller, means for moving said scraper toward and from said roller, a graining-wheel to engage said roller, and means for rotating said wheel, combined with means for effecting a relative movement in the longitudinal direction of the roller between the latter and said scraper and wheel; substantially as set forth.

23. In a machine for treating a roller, means for rotating said roller, an oblique scraper-blade having a concave edge to engage the surface of said roller and the curvature of which edge is on the arc of a circle greater than that of the roller, a graining-wheel to engage said roller, and means for rotating said wheel, combined with means for effecting a relative movement in the longitudinal direction of the roller between the latter and said scraper and wheel; substantially as set forth.

24. In a machine for treating a roller, means for rotating said roller, a solvent-tank, a scraper mounted on said tank to engage said roller, means for adjusting said scraper with relation to said roller, means for adjusting said tank toward and from said roller, and adjustable means carried by said tank for applying a solvent to said roller; substantially as set forth.

25. In a machine for treating a roller, means for rotating said roller, a solvent-tank, a scraper mounted on said tank to engage said roller, means for adjusting said scraper with relation to said roller, a shaft supporting said tank, gear-wheels thereon engaging rack-bars in the machine-frame, means for effecting the upward movement of said gear-wheels along said rack-bars for elevating said shaft and tank, means for locking said shaft and tank in their adjusted positions, and means carried by said tank for applying a solvent to said roller; substantially as set forth.

26. In a machine for treating cylindrical bodies varying in diameter, supporting means for the body, means for acting on said body during its rotation, and means for rotating said body comprising a pivotally-mounted frame carrying a suspended link, a rotary chuck carried by said link and having a gear-wheel, a gear-wheel carried by said frame and in constant mesh with the gear-wheel on said chuck, a driven wheel, and gearing intermediate said driven wheel and said gear-wheel carried by said frame and in constant engagement therewith, whereby said chuck may be adjusted on a given line by the movement of said frame without disengaging said gearing; substantially as set forth.

27. In a machine for treating cylindrical bodies varying in diameter, supporting means for the body, means for acting on said body during its rotation, and means for rotating said body comprising a pivotally-mounted frame carrying a suspended link provided with a horizontal sleeve and being counterbalanced, a rotary chuck having a tubular shank held in said sleeve and said chuck also having a gear-wheel, a gear-wheel carried by said frame and in constant mesh with the gear-wheel on said chuck, a driven wheel, and gearing intermediate said driven wheel and said gear-wheel carried by said frame and in constant engagement therewith, whereby said chuck may be adjusted on a given line by the movement of said frame without disengaging said gearing; substantially as set forth.

28. In a machine for treating a roller, bearings for the shaft of the roller, a scraper for engaging said roller, a rotary screw-shaft and connections for causing said scraper to travel along said roller, means for rotating said shaft, and means for rotating said body comprising a pivotally-mounted frame carrying a suspended link, a rotary chuck carried by said link and having a gear-wheel, a gear-wheel carried by said frame and in constant mesh with the gear-wheel on said chuck, a driven wheel, and gearing intermediate said driven wheel and said gear-wheel carried by said frame and in constant engagement therewith, whereby said chuck may be adjusted on a vertical line by the movement of said frame without disengaging said gearing; substantially as set forth.

29. In a machine for treating a roller, means for rotating said roller, a scraper to engage said roller, and a disk wheel adapted to engage with its flat face said roller, combined with means for effecting a relative movement in the longitudinal direction of the roller between the latter and said scraper and disk wheel, hinged means carrying said disk wheel and permitting the same to be thrown out of operative position when desired, and means for adjusting the relation of said disk wheel with respect to said roller; substantially as set forth.

Signed at New York city, in the county of New York and State of New York, this 24th day of June, A. D. 1905.

SAMUEL CRUMP.
GEORGE SAGUE.

Witnesses:
ARTHUR MARION,
CHAS. C. GILL.